UNITED STATES PATENT OFFICE.

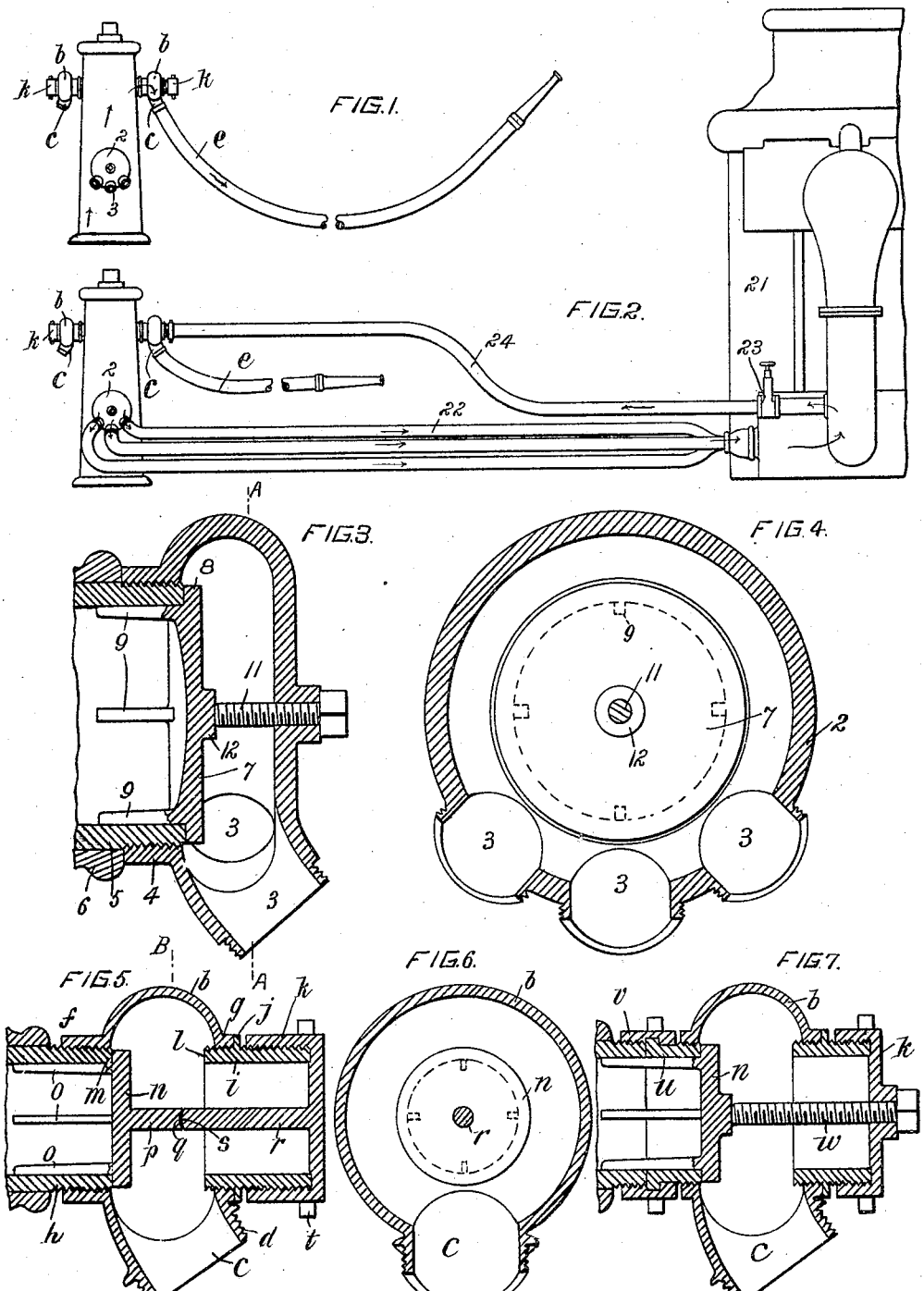

HERBERT JAMES PAGE, OF MONTREAL, QUEBEC, CANADA, ASSIGNOR OF ONE-THIRD TO EUGENE SHELTON RANDALL, AND ONE-THIRD TO THOMAS PALMER HOWARD, OF MONTREAL, CANADA.

DEVICE WHEREBY FIRE-HOSE IS COUPLED TO HYDRANTS.

No. 843,963.     Specification of Letters Patent.     Patented Feb. 12, 1907.

Application filed December 14, 1904. Serial No. 236,904.

*To all whom it may concern:*

Be it known that I, HERBERT JAMES PAGE, of the city of Montreal, province of Quebec, Canada, have invented certain new and useful Improvements in Devices whereby Fire-Hose is Coupled to Hydrants; and I do hereby declare that the following is a full, clear, and exact description of the same.

My invention has for its object to provide means whereby after a stream has been laid from a hydrant high pressure can be applied thereto without cutting off or in any way interfering with its supply during the operation and to otherwise improve the means for coupling fire-hose to hydrants.

The invention may be said briefly to consist of a coupling adapted to be carried, preferably, by the hydrant, and having a plurality of ports, one of which is adapted to communicate with the hydrant, another with a source of high pressure, and the other or others with hose branches, such coupling carrying valvular means whereby the hydrant and high-pressure ports, respectively, are controlled, and a second coupling having one or more ports adapted to have the suction end of the source of pressure connected thereto, and a port adapted to be connected to the hydrant, preferably to the lower end thereof, this latter coupling containing valvular means whereby the hydrant-port is controlled.

For full comprehension, however, of my invention reference must be had to the accompanying drawings, forming a part of this specification, in which similar reference characters indicate the same parts, and wherein—

Figure 1 is a side elevation of a hydrant with a hose coupled thereto by my improved device. Fig. 2 is a similar view illustrating a steam fire-engine drawing from the hydrant and supplying high pressure to the hose length. Fig. 3 is an axial sectional view of that portion of my invention for coupling the suction-pipes of the engine to the hydrant. Fig. 4 is a transverse sectional view thereof, taken on line A A, Fig. 3. Fig. 5 is an axial sectional view of that portion of my improved means for coupling the hose to the hydrant and the discharge-pipe of the fire-engine to the hose. Fig. 6 is a transverse sectional view thereof, taken on line B B, Fig. 5; and Fig. 7 is an axial sectional view of a modification thereof.

The device by which I couple a hose to the hydrant, and subsequently the steam fire-engine to the hose, without reducing the pressure in the latter during the operation, consists of, preferably, a casing $b$ of substantially oblate spheroidal form, having in the side thereof one or more discharge-ports $c$, formed with means $d$, whereby the one or more hose lengths $e$ can be connected. Each end of this casing is formed with flanged ports $f$ and $g$, respectively, in axial line with one another, the port $f$ being adapted to be screwed upon the usual exteriorly-screw-threaded bushing $h$ of the hydrant, and the port $g$ having a bushing $i$ screwed therein, while the latter is flanged, as at $j$, and exteriorly screw-threaded to receive a cap $k$. The function of the flange is to determine the extent the inner end of the bushing $i$ can be screwed into port $g$, thereby establishing an annular seat $l$, raised from the interior of the wall of the casing. A similar seat $m$ is formed by the outer end of the bushing $h$ of the hydrant.

A valvular disk $n$ is adapted to play between the seats $l$ and $m$, and it is guided in its movement and retained against displacement out of the line of such seats by a series of fingers $o$, carried rigidly by, preferably, the side thereof adjacent to the port $f$ and adapted to project into the bushing $h$ of the hydrant and be slidable therein. The side of the disk adjacent to the port $g$ has an axial projection $p$ with its end preferably cupped, as at $q$, and the interior of the end of the cap has an inwardly and axially projecting finger $r$ with its end, preferably, rounded, as at $s$, to engage in the cupped end of projection $p$, while the exterior of the cap is provided with studs $t$, or other means, to enable it to be turned.

If desired, the device just described can be a fixture upon the hydrant, as shown in Figs. 1, 5, and 6, or portable and adapted to be coupled to the hydrant, as shown in Fig. 7. In the latter case a bushing $u$, corresponding in capacity to the hydrant-bushing $h$ in the port $g$, and a nipple $v$, carried thereby, enables it to be coupled to such hydrant-bushing, while the cap $k$ is made less deep, and a screw $w$, with a jam-nut $x$ thereon, is carried in a tapped perforation in the cap in substitution for the finger r.

When the cap k or screw w is screwed outwardly, the water will force the valvular disk away from the seat m and flow through the discharge port or ports c; but the cap will prevent the escape thereof through port g until such cap is almost free of the bushing i or the screw is out to the end of its travel, and then the disk will be resting upon the seat l and prevent such escape, thus allowing the cap to be completely removed.

The device by which I provide for coupling of the suction end of the fire-engine to the hydrant consists of a cap 2 of substantially oblate spheroidal form, provided with one or more (usually three) egress-ports 3 and having at one oblated end a flanged interiorly-screw-threaded port 4, adapted to be screwed upon the usual exteriorly-screw-threaded bushing 5, carried in the large egress-port 6, commonly near the base of the hydrant. A valvular disk 7 within this casing is formed with a circumferential flange 8, adapted to be seated upon the end of the bushing 5 when the cap is in place, and has a series of guiding-fingers 9 formed rigidly thereon and slidably located in such bushing for the purpose of maintaining the disk constantly parallel to and in line with its seat. A screw 11, carried in a tapped perforation in the other end of the cap and in line with a boss 12 upon the disk, is adapted to prevent the displacement of the latter from its seat by the water until the screw is turned outwardly, which is done when it is desired to have water flow from the egress port or ports 3.

I prefer to have both parts of my coupling mechanism carried permanently by the hydrant, and the manner of using the same is as follows: After an alarm of fire is rung in a hose-reel is usually the first to arrive at the hydrant nearest to the fire. One or more lines e are then immediately laid from one or more of the ports c, and simultaneously one of the men turns on the water. The cap k or screw w is then screwed out, thereby releasing the valve n and allowing the water to force it back against the seat l, and the stream or streams are then ready to be played, the course of the water being as indicated by arrows in Fig. 1. Upon the arrival of the fire-engine (a portion of which is indicated at 21) its suction-pipes 22 are coupled to the egress-ports 3 of the device 2, the cap k is removed, and the discharge-port 23 of the engine is connected by a pipe 24 to the port g of the device b. The engine being started will of course exert a force upon the valvular disk n greater than the pressure in the hydrant, thus moving such disk from the seat l to the seat m and simultaneously causing one or more high-pressure streams to take the place of the low-pressure ones without interrupting the latter, the course of the water to feed such high-pressure stream or streams being as indicated in Fig. 2.

It is obvious that by employing coupling mechanism constructed according to my invention a stream having been laid from a hydrant high pressure can be applied thereto without cutting off or in any way interfering with its supply during the operation, and, furthermore, that the points of a hydrant to which connections can be made can be increased—such as, for instance, a hydrant having only three vent-ports being converted into a five-vent-port hydrant.

By enabling the steamer to be coupled to the streams already in use no extra streams need be laid when the engine arrives after the hose-reel men have made their connections, which, as before pointed out, is usually the case, an important advantage being that owing to the ability to make additional connections after the first without shutting off the first or any previously made a fireman entering a burning building need never have his supply cut off.

Should the pressure in the steamer at any time fall below that in the hydrant, the coupling will instantaneously reverse the course of the water and take it directly from the hydrant.

What I claim is as follows:

1. The combination with a device for coupling a hose to a hydrant and having a high-pressure connection, of valvular means adapted to be controlled by the hydrant-pressure to close the high-pressure connection and also controlled by the high-pressure to cut the communication with the hydrant and simultaneously effect a communication between the high-pressure connection and the hose.

2. A casing having a discharge-port and a pair of openings, means whereby a hose length is coupled to the said port, means whereby one of the openings is coupled to the hydrant, means whereby the force-pump of a fire-engine is coupled to the other of the opening, and valvular means moved by the pressure of the water flowing from the hydrant, into position closing the opening for receiving the fire-engine connection and such means being also adapted to be moved by the pressure from the engine into position closing the hydrant connection.

3. A device for coupling a hose to a hydrant and subsequently a fire-engine to the hose without reducing the pressure in the latter during the operation, consisting of a casing having a discharge-port in the sides thereof and openings in its opposite ends, means whereby a hose length is coupled to the said port, means for coupling the opening in one end of the casing to the hydrant the opposite end being formed with an encircling flange adapted to have the force-pipe of a fire-engine coupled thereto, a cap screwed upon such flange, a valve within the casing and movable from one to the other of the openings in the ends thereof, and means effecting an operative connection between the cap and the valve.

4. A device for coupling a hose to a hydrant and subsequently a fire-engine to the hose without reducing the pressure in the latter during the operation, consisting of a casing having a discharge-port in the sides thereof and openings in its opposite ends, means whereby a hose length is coupled to the said port, means for coupling the opening in one end of the casing to the hydrant the opposite end being formed with an encircling flange adapted to have the force-pipe of a fire-engine coupled thereto, a cap screwed upon such flange, a valve within the casing and movable from one to the other of the openings in the ends thereof, and, a device carried by the cap and adapted to bear upon the valve and retain the same seated upon the opening communicating with the hydrant when the cap is screwed onto the flange.

5. A device for coupling a hose to a hydrant and subsequently a fire-engine to the hose without reducing the pressure in the latter during the operation, consisting of a casing having a discharge-port in the sides thereof and openings in its opposite ends, means whereby a hose length is coupled to the said port, means for coupling the opening in one end of the casing to the hydrant the opposite end being formed with an encircling flange adapted to have the force-pipe of a fire-engine coupled thereto, a cap screwed upon such flange, a valve within the casing and movable from one to the other of the openings in the ends thereof, a screw carried adjustably by the cap and adapted to bear upon the valve and retain the same seated upon the opening communicating with the hydrant when the cap is screwed onto the flange.

6. A device for coupling a hose to a hydrant comprising a valve-casing having an intake-port and an outtake-port, of a second intake-port the seat whereof is parallel to and a short distance from the seat of the first intake-port and a valve adapted to be seated upon either of such seats, and means for guiding the said valve to cause it to move from one seat to the other in a rectilineal line lying in a plane extending at right angles to the seats for the purpose of causing one of the ports to be closed when the other is open.

7. The combination with a valve-casing having a pair of intake-ports at opposite sides thereof and an outtake-port, of a valvular disk located movably between such intake-ports and whereby one of the said intake-ports is closed when the other is opened and guiding-ribs upon the disk and slidably within one of the intake-ports for guiding the said disk in its movement from one port to the other such disk being free to play between the ports and adapted to be moved by the excessive pressure in one of the ports into closing relation with the other port.

8. The combination with a valve-casing having a pair of ports in opposite sides and a third port, of a valvular disk adapted to play freely between and be seated upon either of the said pair of ports, a cap outside of the casing and closing one of such pair of ports and a screw carried by the said cap in line with the disk and in bearing relation therewith.

9. An oblate spheroidal valve-casing having an intake-port in one of its flattened ends and a series of outtake-ports in a side at an angle to the intake-port, of a rectilinearly-movable valvular disk for closing such intake-port, and a screw carried by the opposite flattened end of such casing and in line with the disk and for the purpose of retaining the latter in variable adjacency to the intake-port.

10. The combination with a hydrant having a pair of discharge-ports, of a device for coupling a hose to one of such ports, means for connecting the suction end of a fire-engine to the other of such ports, and means for connecting the discharge end of the engine to such hose without disturbing the first-mentioned connection.

In testimony whereof I have signed my name to this specification in the presence of two subscribing witnesses.

HERBERT JAMES PAGE.

Witnesses:
WILLIAM P. McFEAT,
FRED. J. STEARS.